US012547244B2

United States Patent
Hu et al.

(10) Patent No.: US 12,547,244 B2
(45) Date of Patent: Feb. 10, 2026

(54) GAZE-DRIVEN AUTOFOCUS CAMERA FOR MIXED-REALITY PASSTHROUGH

(71) Applicant: Meta Platforms Technologies, LLC, Menlo Park, CA (US)

(72) Inventors: Te Hu, San Jose, CA (US); Ian Erkelens, Kirkland, WA (US); Lidu Huang, Danville, CA (US); Yizhi Xiong, Foster City, CA (US); Ilya Brailovskiy, Fremont, CA (US); Lawrence Chang-Yung Wang, Mountain View, CA (US); Devraj Gupta, San Diego, CA (US); Honghong Peng, Los Altos, CA (US); Sebastian Sztuk, Virum (DK)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/587,512

(22) Filed: Feb. 26, 2024

(65) Prior Publication Data
US 2025/0199607 A1    Jun. 19, 2025

Related U.S. Application Data

(60) Provisional application No. 63/493,704, filed on Mar. 31, 2023.

(51) Int. Cl.
*G06F 3/01* (2006.01)
*H04N 23/62* (2023.01)

(52) U.S. Cl.
CPC ............. *G06F 3/013* (2013.01); *H04N 23/62* (2023.01)

(58) Field of Classification Search
CPC .... G06F 3/013; H04N 23/62; G02B 27/0093; G02B 27/0172; G02B 2027/0138; G02B 2027/0187
See application file for complete search history.

(56) References Cited

U.S. PATENT DOCUMENTS

| | | | |
|---|---|---|---|
| 11,481,960 B2 * | 10/2022 | Marra | G06T 15/20 |
| 12,141,998 B2 * | 11/2024 | Agrawal | G06T 7/11 |
| 2015/0002394 A1 | 1/2015 | Cho et al. | |
| 2018/0103194 A1 * | 4/2018 | Tang | G02B 27/0172 |
| 2018/0284437 A1 | 10/2018 | Jones | |
| 2019/0385372 A1 * | 12/2019 | Cartwright | G06T 19/003 |

(Continued)

OTHER PUBLICATIONS

EPO—European Search Report for European Patent Application No. 24166912.6, dated Jul. 18, 2024, 6 pages.

*Primary Examiner* — Mihir K Rayan
(74) *Attorney, Agent, or Firm* — Greenberg Traurig, LLP

(57) ABSTRACT

Particular embodiments are directed to passthrough image generation for a mixed-reality experience. A device may determine, using an eye-tracking system of a head-mounted device, eye-tracking data associated with a user of the head-mounted device. The device may determine, based on the eye-tracking data, a desired scene depth for the user. The device may instruct a first autofocus camera of the head-mounted device to adjust a first focus distance based on the desired scene depth and capture a first image of a real-world environment of the user. The device may generate a first passthrough image based on the first image. The device may display the first passthrough image to a first eye of the user via a first display of the head-mounted device.

20 Claims, 7 Drawing Sheets

(56) References Cited

U.S. PATENT DOCUMENTS

| | | | |
|---|---|---|---|
| 2020/0143584 A1* | 5/2020 | Noris | G06T 19/20 |
| 2021/0014408 A1* | 1/2021 | Timonen | H04N 23/633 |
| 2021/0173474 A1* | 6/2021 | Sztuk | G06F 3/013 |
| 2021/0235054 A1* | 7/2021 | Silverstein | G06F 3/013 |
| 2023/0037329 A1 | 2/2023 | Erkelens et al. | |

* cited by examiner

GAZE-DRIVEN AUTOFOCUS CAMERA FOR MIXED-REALITY PASSTHROUGH

PRIORITY CLAIM

This application claims the benefit under 35 U.S.C. § 119(e) of U.S. Provisional Patent Application No. 63/493,704, filed 31 Mar. 2023, which is incorporated herein by reference

TECHNICAL FIELD

This disclosure generally relates to mixed-reality (MR) rendering, and more specifically to techniques for using and controlling autofocus cameras for generating mixed reality.

BACKGROUND

A head-mounted device (HMD) featuring a stereo display can deliver an immersive experience within a three-dimensional environment. While wearing an HMD, a user's vision of the surrounding physical environment is blocked by the HMD's physical structure and display. Mixed Reality (MR) solves this issue by using the HMD's cameras to capture a real-time, low-latency live feed of the surrounding physical environment and display the live feed to the user, thereby enabling users to seamlessly perceive their environment as if they were not wearing an HMD. Additionally, users can augment their surroundings by overlaying virtual elements onto the real world.

"Passthrough" refers to the MR feature that allows user to see their physical surroundings while wearing an HMD. Information about the user's physical environment is visually "passed through" to the user by having the headset of the artificial reality system display information captured by the headset's external-facing cameras. Simply displaying the captured images would not work. Since the locations of the cameras do not coincide with the locations of the user's eyes, images captured by the cameras do not accurately reflect the user's perspective. In addition, since the images have no depth information, simply displaying the images would not provide the user with proper parallax effects if he were to shift away from where the images were taken. Incorrect parallax, coupled with user motion, could lead to motion sickness.

Passthrough images are generated by reprojecting or warping images captured by cameras of an artificial-reality device toward the user's eye positions using depth measurements of the scene (depth could be measured using depth sensors and/or machine-learning-based approaches). An artificial-reality headset may have a left external-facing camera and a right external-facing camera used for capturing images used for passthrough generation. Based on depth estimates of the scene, the left image captured by the left camera is reprojected to the viewpoint of the left eye, and the right image captured by the right camera is reprojected to the viewpoint of the right eye. The reprojected images captured by the cameras, when displayed to the user, would approximate how the captured scene would have appeared had it been observed from the perspective of the user's eyes.

Traditionally, external-facing cameras on HMDs have fixed focal lengths with a predetermined, static depth of field (DoF). Objects located within the DoF of the camera would have acceptable sharpness, whereas objects closer to the camera or beyond the far range of the DoF would appear blurry. As such, passthrough images generated from images captured by fixed-focus cameras would have the same limitations. If the user is looking at objects located within the DoF of the external-facing cameras, the objects would appear sharp. But when the user focuses on near or far-field objects located beyond the cameras' DoF, those objects would appear blurry and out of focus in the passthrough scene. Another known shortcoming of fixed-focus cameras is that objects captured outside of the camera system's peak focus distance would lose clarity, which in turn means that such objects would appear less clear in the passthrough scene. Furthermore, due to the limitations of fixed-focus cameras, designing a MR system that captures the entire scene within the intended DoF is impractical a resolution is scaled up. For at least these limitations fixed-focused cameras, an improved capturing system is desired.

SUMMARY OF PARTICULAR EMBODIMENTS

Embodiments described herein are directed to an MR system capable of delivering passthrough images that are in focus and sharp in areas where the user is viewing. Instead of using fixed-focus cameras, embodiments of HMDs described herein use autofocus cameras to capture the user's surroundings for passthrough generation. Autofocus cameras use sensors and algorithms to automatically adjust the focal length of the lenses in order to capture sharp images. Some modern cameras use advanced autofocus technologies, such as phase detection or contrast detection, to improve accuracy. Moreover, they may incorporate additional sensors, like depth sensors or infrared sensors, to gather more information about the scene and assist the autofocus system in making more informed decisions. Despite these advanced techniques, autofocus cameras would struggle to produce the desired results in scenarios where the user's specific focus point is unknown. For instance, when the autofocus cameras of an HMD capture the user's physical environment, the cameras' autofocus system, without more information, would not know what to focus on. One option is to configure the autofocus system to optimize the sharpness of the center region of the camera's field of view. Doing so would result in sharp, in-focused center regions in the passthrough images, which would be fine if the user happens to be looking at the center. However, when the user is looking somewhere other than the center (e.g., the outer edges of the passthrough image), the passthrough image would be blurry and out of focus if the scene in the periphery is significantly farther or closer than objects in the center. For example, if the center of the scene is a computer/phone that is 30-50 cm away from the user, the autofocus system would adjust its limited DoF to optimize for that distance. If the background scene is 10-15 meters away, the periphery of the captured image would be blurry since the background scene is outside of the cameras' DoF. Thus, when the user views the passthrough image generated from the captured image, the background scene would be blurry even though the user is focused on it. Thus, simply equipping an HMD with autofocus cameras would not be enough.

Another solution to the aforementioned problem may be to equip an HMD with a camera system with infinite DoF, in which case autofocus lenses might not be needed. However, camera systems with infinite DoF may be impractical for HMDs due to cost and signal-to-noise ratio (SNR) tradeoffs (e.g., cameras capable of achieving the desired SNR may be too costly for an HMD product).

To balance the trade-off between DoF, SNR, and resolution, embodiments described herein use autofocus cameras with a finite DoF. In addition to being less costly, such autofocus cameras can provide better SNR and resolution because the relaxed DoF constraint allows the camera to have a wider aperture, which in turn allows more light to reach the image sensors. As previously explained, merely equipping an HMD with autofocus cameras would be insufficient because the cameras would not know where to focus. In the context of passthrough generation, a user wearing an HMD would be moving while the HMD captures a video (or sequence of frames) of the user's physical environment. The user may be interacting with physical or virtual objects, or simply passively observing what's presented on the HMD displays. While immersed in MR, the user's gaze may be directed to any area within the 3D display, including the periphery; the user would not be providing explicit instructions on where to focus. This is different from traditional use cases, such as point-and-shoot cameras and mobile phones. There, the user would typically provide explicit instructions to the camera system by aiming the camera at a particular object of interest. Some autofocus systems may also determine what to focus on based on particular objects or content in the scene that would likely be of interest to the user (e.g., people's faces). When satisfied with the camera's focus, the user would then press the shutter button to capture an image. When capturing a video, autofocus systems may employ different autofocus modes, such as continuous autofocus (C-AF) or face detection, to help maintain focus on a subject even as it moves within the frame. In MR, however, the device would not receive explicit focus or capture instructions, and the autofocus system cannot simply rely on content in the scene because the user could be focusing on something entirely different.

Embodiments described herein address the foregoing challenges inferring the user's intent and interest based on their gaze. An HMD may have an eye-tracking system capable of measuring the user's current eye gaze and eye movement. The HMD may use such eye-tracking data to predict the user's gaze at a future time at which a passthrough image would be rendered and displayed to the user. The region of interest to the user may be determined in a variety of ways. For example, the predicted gaze, coupled with a measured depth of the scene (e.g., generated using time-of-flight sensors, stereo sensors, structured-light sensors, or machine-learning-based techniques), allows the HMD's autofocus system to determine the optical focal distance for the camera's lenses. The autofocus system may compute the intersection between the user's screen-space gaze location (x, y) and the scene depth to determine the region of interest. In another example, the autofocus system may determine the region of interest by finding objects that are near the eye-tracking vector. In yet another example, the autofocus system may use a combination of gaze vector intersection and a machine-learning model trained on user data to determine the user's region of interest. Based on the determined regions of interest, the autofocus cameras may adjust its focal distance so that the captured images and the resulting passthrough images would be sharp and in focus.

In some aspects, the techniques described herein relate to a method including, by a computing system: determining, using an eye-tracking system of a head-mounted device, eye-tracking data associated with a user of the head-mounted device; determining, based on the eye-tracking data, a desired scene depth for the user; instructing a first autofocus camera of the head-mounted device to adjust a first focus distance based on the desired scene depth and capture a first image of a real-world environment of the user; generating a first passthrough image based on the first image; and displaying the first passthrough image to a first eye of the user via a first display of the head-mounted device.

In some aspects, the techniques described herein relate to a method, further including: instructing a second autofocus camera of the head-mounted device to adjust a second focus distance based on the desired scene depth and capture a second image of the real-world environment of the user; generating a second passthrough image based on the second image; and displaying the second passthrough image to a second eye of the user via a second display of the head-mounted device.

In some aspects, the techniques described herein relate to a method, further including: generating predicted gazes of the user based on the eye-tracking data; wherein the desired scene depth is determined based on the predicted gazes.

In some aspects, the techniques described herein relate to a method, wherein the predicted gazes are associated with a future time determined based on a predetermined duration corresponding to a latency associated with a pipeline for rendering passthrough images.

In some aspects, the techniques described herein relate to a method, wherein the desired scene depth is determined based on a vergence of the predicted gazes of the user.

In some aspects, the techniques described herein relate to a method, wherein the desired scene depth is determined based on an intersection between the predicted gazes of the user and a three-dimensional model representation of the real-world environment.

In some aspects, the techniques described herein relate to a method, wherein the desired scene depth is determined based on an intersection between the predicted gazes of the user and one or more virtual objects positioned relative to the real-world environment.

In some aspects, the techniques described herein relate to a method, wherein the desired scene depth is further determined based on an interaction between the user and one or more virtual objects or physical objects.

The techniques described herein may be embodied within a system or as software stored in one or more computer-readable non-transitory storage media that is operable when executed by one or more processors.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
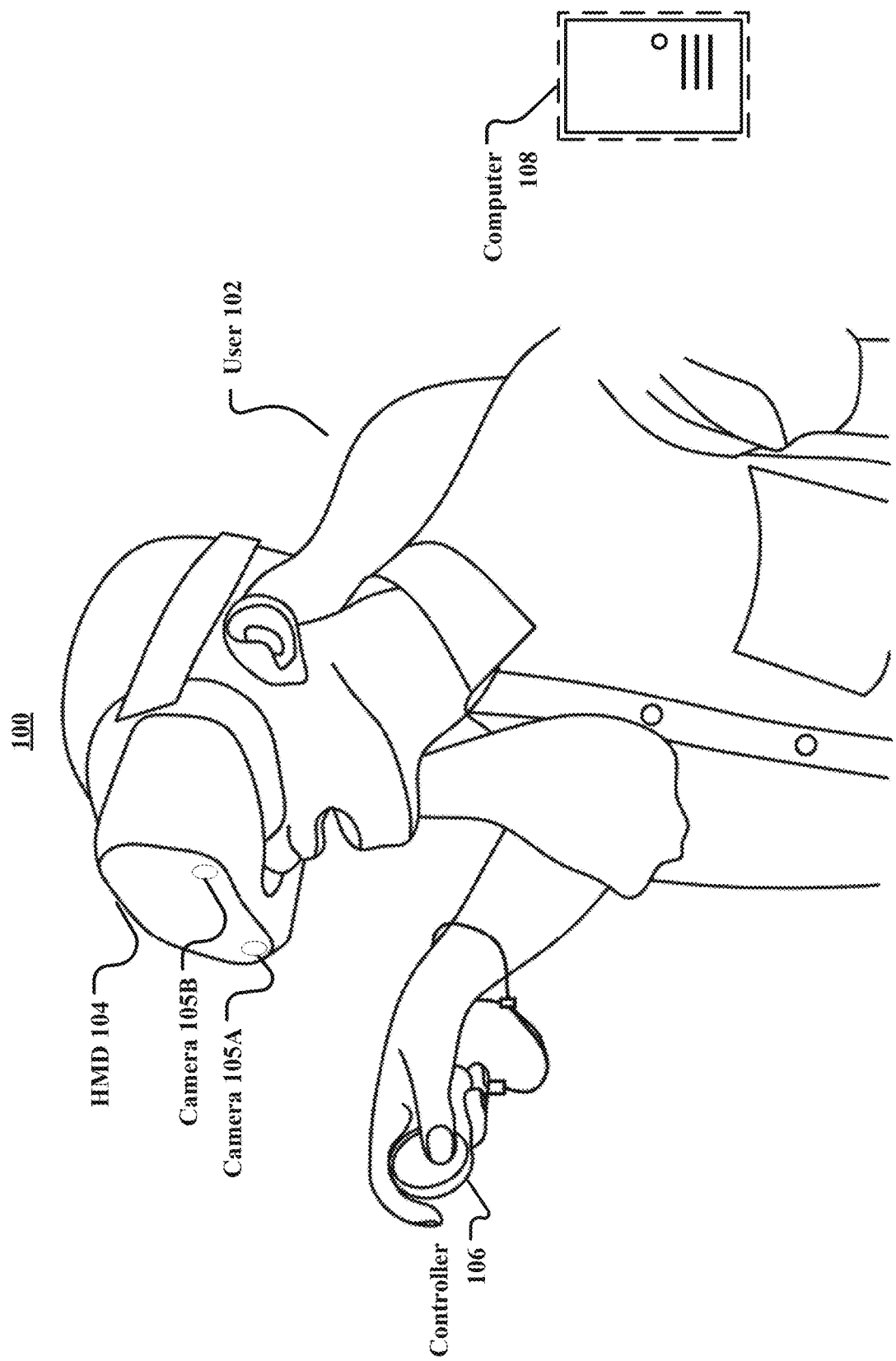
FIG. 1A illustrates an example artificial reality system worn by a user, in accordance with particular embodiments.

In the context of mixed reality, "passthrough" refers to a feature that allows users to see their physical surroundings while wearing an HMD. Information about the user's physical environment is visually "passed through" to the user by having the HMD display information captured by the headset's external-facing cameras. Simply displaying the captured images would not work as desired. Since the locations of the cameras do not coincide with the locations of the user's eyes, images captured by the cameras do not accurately reflect the user's perspective. In addition, since the images have no depth, simply displaying the images would not provide the user with proper parallax effects if he were to shift away from where the images were taken. Thus, rather than simply displaying the captured images, images captured by the cameras need to be warped or reprojected to the perspective of the user's eyes. For example, an HMD may have a left camera and a right camera for capturing images that will be passed through to the user's left eye and right eye, respectively. At a high level, images may be reprojected to the perspective of the user's eyes using a 3D model of the user's physical environment (e.g., a mesh, depth map, or any other suitable representation of depth information). The 3D model may be generated based on depth information captured using any suitable technique (e.g., stereo depth, time-of-flight sensors, machine-learning-based depth estimation, etc.). The captured images may be used as textures for the 3D model. When rendering a passthrough image for the user's left eye, an MR module may determine portions of the 3D model that are visible to the user's left eye (e.g., by casting rays from a location corresponding to the user's left eye toward the 3D model) and sample the corresponding image captured by the left camera. Similarly, the passthrough image for the user's right eye may be generated using the image captured by the right camera.

Since passthrough images are generated from captured images, the type of camera used for the image capture plays an important role. Traditionally, HMDs are equipped with fixed-focus cameras with a static DoF. Objects located within the cameras' DoF would appear sharp and in focus, but objects located outside of it would appear blurry. As previously explained, a user may be focused on any object in the scene. When the user looks at objects within the camera's DoF, the objects would appear sharp and in focus; but when the user looks at objects that are outside of the camera's DoF, the objects would appear blurry and out of focus.

The present disclosure aims to deliver an improved MR experience to users. The goal is to deliver passthrough images with similar fidelity as what the human eyes can see when the real-world environment is not being blocked by the HMD. This includes allowing the user to focus on objects at different locations in the scene and presenting sharp and in-focus images of those objects regardless of their location. To address the aforementioned focal issues, particular embodiments described herein equip the HMD with auto-focus cameras to capture images used for passthrough. Auto-focus cameras provide the HMD with the ability to focus on objects at different depths in the scene, but that's only half of the solution. In the context of MR, the user would be relying on a constant stream of passthrough images to see the real-world environment and engage with various MR experiences. It would be impractical for the user to provide the autofocus system with constant, explicit instructions on where to focus. Thus, particular embodiments described herein further use eye-tracking techniques to track the user's gaze and use the eye-tracking data to drive the cameras' auto-focus algorithm. The auto-focus algorithm may use a combination of eye-tracking data, scene depth information, phase detection autofocus, objection detection, etc., to determine the user's vergence depth plane and adjust the cameras' focal distance accordingly. In doing so, the objects at which the user is looking would appear sharp at all times since the cameras would automatically adjust their DoF to cover the region where those objects are located.

Auto-focus cameras may be mounted on the exterior housing of an HMD to capture the user's physical real-world environment. In particular embodiments, one or more cameras may be used. For example, a left camera may be placed close to the user's left-eye position to capture images that would be used to generate passthrough images for the left eye. Similarly, a right camera may be placed close to the user's right-eye position to capture images that would be used to generate passthrough images for the right eye. In particular embodiments, these cameras may be monochrome or RGB cameras. In embodiments where the cameras are monochrome but colored passthrough images are desired, one or more additional RGB cameras may be mounted on the HMD to capture color information (e.g., the RGB camera may be mounted in the center of the HMD between the left and right monochrome cameras). During the passthrough rendering process, color information captured by the RGB camera may then be used to colorize the grayscale images captured by the monochrome cameras.

FIG. 1A illustrates an example of an artificial reality system 100 worn by a user 102. In particular embodiments, the artificial reality system 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1A, the HMD 104 may completely cover the user's field of view. By being the exclusive provider of visual information to user 102, the HMD 104 achieves the goal of providing an immersive artificial-reality experience. One consequence of this, however, is that the user 102 would not be able to see the physical environment surrounding him, as his vision is shielded by the HMD 104. As such, the passthrough feature described herein is needed to provide the user with real-time visual information about his physical surroundings.

Figure 1B:
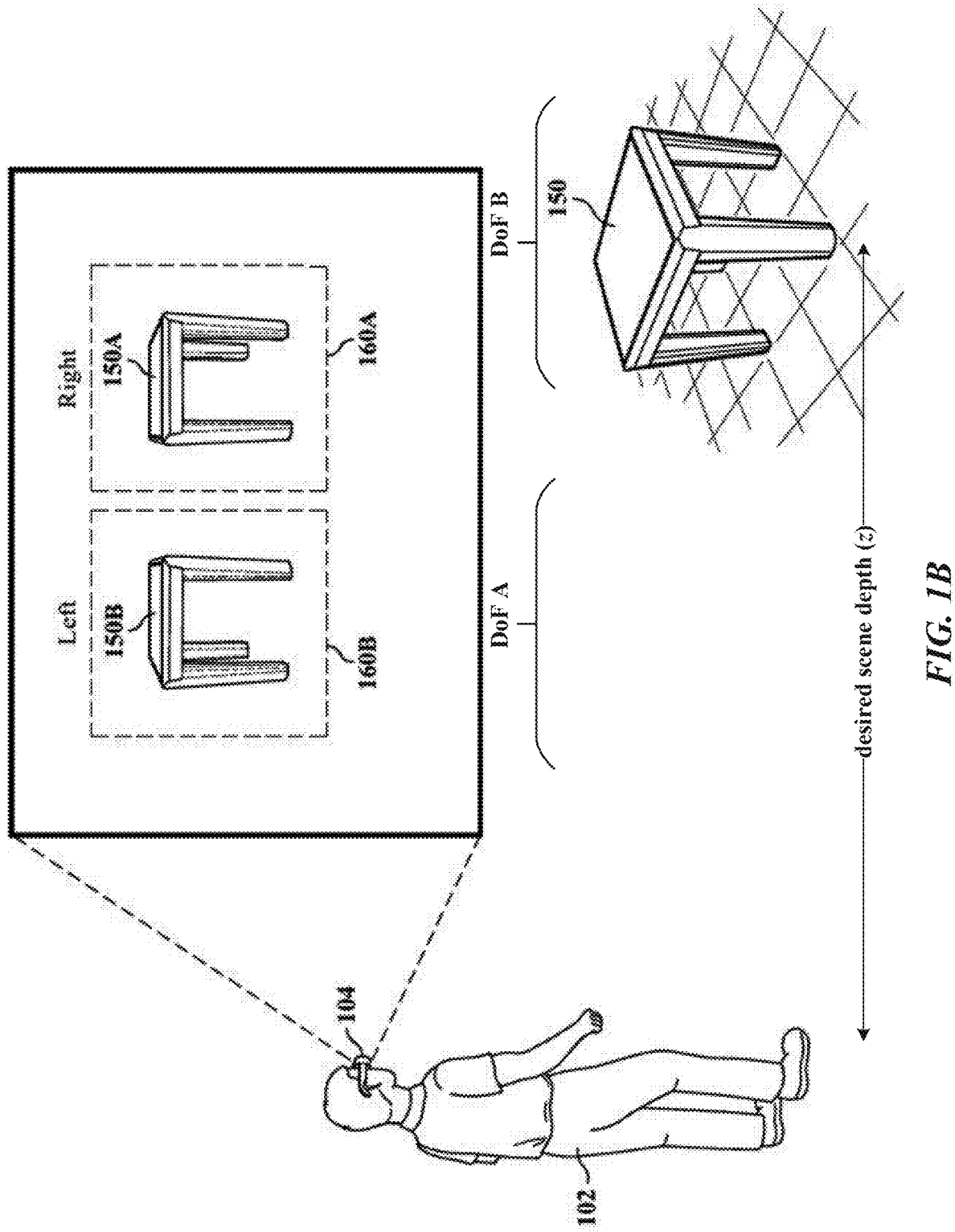
FIG. 1B illustrates an example of a passthrough feature, in accordance with particular embodiments.

FIG. 1B illustrates an example of the passthrough feature. A user 102 may be wearing an HMD 104, immersed within a virtual reality environment. A physical table 150 is in the physical environment surrounding the user 102. However, due to the HMD 104 blocking the vision of the user 102, the user 102 is unable to directly see the table 150. To help the user perceive his physical surroundings while wearing the HMD 104, the passthrough feature captures information about the physical environment using, for example, the aforementioned external-facing cameras 105A-B. The captured information may then be re-projected to the user 102 based on his viewpoints. In particular embodiments where the HMD 104 has a right display 160A for the user's right eye and a left display 160B for the user's left eye, the system 100 may individually render (1) a re-projected view 150A of the physical environment for the right display 160A based on a viewpoint of the user's right eye and (2) a re-projected view 150B of the physical environment for the left display 160B based on a viewpoint of the user's left eye.

A user 102 in MR may be interested in seeing or interacting with any virtual or physical objects at any given time. For example, the user 102 may be playing a game of chess through a virtual chessboard anchored to the top of table 150. While the user 102 is analyzing the chessboard, it would be reasonable to overlay the virtual chessboard over a sharp passthrough image of the table 150. As such, in this example, the user's desired scene depth would correspond to the distance between the user and the table 150. The autofocus cameras on the HMD 104 may or may not have the proper focal distance to put the table 150 in focus. For example, the autofocus cameras may initially have a focal distance that gives them a depth of field corresponding to DoF A, as shown in FIG. 1B. Since the table 150 is not located within DoF A, the table 150 would appear blurry and out-of-focus in images captured by the cameras. The blurriness of the table 150 would in turn be reflected in the passthrough images 150A-B. After the HMD 104 determines the desired scene depth, it may instruct the autofocus cameras to adjust their focal distances so that the cameras' updated depth of field corresponds to DoF B. Now that the table 150 is within DoF B, the table 150 would appear sharp and in focus in the images captured by the cameras, which in turn would be reflected in the passthrough images 150A-B.

Referring again to FIG. 1A, the HMD 104 may have external-facing cameras, such as the two forward-facing cameras 105A and 105B shown in FIG. 1A. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, side-facing cameras capturing the sides of the user, and/or an internal camera for capturing the user's eye gaze for eye-tracking purposes). The external-facing cameras are configured to capture the physical environment around the user and may do so continuously to generate a sequence of frames (e.g., as a video). Any combination of the cameras may be used for, e.g., localization, mapping, 3D reconstruction, hand tracking, body tracking, controller tracking, etc. Particular cameras, such as cameras 105A-B, may be used to capture images used for passthrough generation. As will be further discussed below, the external-facing cameras 105A-B may be auto-focus cameras, which are capable of dynamically adjusting their focal distances when capturing images. An auto-focus algorithm running on the HMD 104 may be used to control the relative distance or configuration of the lenses of the cameras, thereby adjusting the focal distance of the cameras.

As previously explained, although images captured by the forward-facing cameras 105A-B may be directly displayed to the user 102 via the HMD 104, doing so would not provide the user with an accurate view of the physical environment since the cameras 105A-B cannot physically be located at the exact same location as the user's eyes. As such, the passthrough feature described herein involves using a passthrough pipeline to process the raw images captured by the cameras 105A-B and generate final passthrough images displayed to the user. In particular embodiments, the pipeline may involve a re-projection technique, where the captured images are conceptually projected onto a 3D representation of the physical environment (e.g., a 3D mesh, depth map, or any other 3D model) and re-projected to the user's eye positions. It should be understood that this re-projection technique is provided as one example of how passthrough images may be generated. The present disclosure, however, is not limited to the re-projection technique and could be applied to other types of passthrough pipelines as well.

As will be described in further detail below, particular embodiments use depth information of the user's surroundings to, e.g., determine the desired focal distance for the cameras, detect objects of interest, and/or create a 3D representation of the environment used for the aforementioned re-projection passthrough-generation technique. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, it could use triangulation and/or machine-learning techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located. In particular embodiments, stereo depth measurements may be assisted using structured light, where infrared light patterns may be projected from one or more projectors on the HMD onto the environment. Images of the scene captured by cameras 105A-B (or another pair of stereo cameras) would also capture the projected light patterns. The light patterns would assist the depth-computation algorithm to find correspondences between the images, which in turn would result in more accurate depth estimations. As yet another example of a depth measurement technique, the HMD may be equipped with a time-of-flight sensor (e.g., LiDAR). A laser, infrared light, or other type of light source on the HMD may project photons into the scene. Some of the photons would reflect toward the HMD and be captured by the time-of-flight sensor. The time it takes the photons to reflect may be used to compute the distance between the sensor and the object off of which the photons reflected. In yet another embodiment, depth may be estimated using machine-learning techniques. For example, a machine-learning model may be configured to take as input one or more images of the scene and/or a sparse depth measurement (e.g., computed using any of the aforementioned techniques, such as stereo depth, time-of-flight depth, etc.) and output a depth map of the scene. While several specific examples of depth measurement techniques are described, this disclosure contemplates using any suitable depth measurement techniques.

In particular embodiments, the HMD 104 may be equipped with an eye-tracking system. The present disclosure may employ any suitable eye-tracking system, such as those based on active light (e.g., infrared or near-infrared), passive light, electric potential measurements, etc. For example, the HMD 104 may include one or more inward-facing cameras pointing at each eye. Within the eye box, infrared light sources may illuminate. The inward-facing cameras may capture images of each eye, which would include reflections of the infrared light sources. An eye-tracking algorithm may then use the pattern of light reflected off of the user's eyes to estimate the gaze direction of each eye. The gaze of each eye may be represented as a gaze vector. Once the gazes of the user's eyes are computed via this or any other suitable technique, the user's eye gazes may be used to estimate regions in 3D space that are of interest to the user. For example, the MR system may use any suitable method to compute a vergence of the user's eye gazes (e.g., the point of intersection of the gaze of the right eye and the gaze of the left eye) to estimate a focal point of the user, which in turn could be used to compute a distance between the focal point and the user. This distance may be considered as the desired scene depth for the user, which may be used to instruct the HMD's 104 autofocus cameras, as will be described in more detail below.

In particular embodiments, the pose (e.g., position and orientation) of the HMD 104 within the environment may also be used to determine the desired scene depth of the user. For example, the pose of the HMD, along with the user's eye gaze, may be used to determine which virtual or physical object the user is looking at. The pose of the HMD 104 may be determined using any suitable technique, including SLAM (simultaneous localization and mapping). Using the pose of the HMD 104 and the estimated eye gazes of the user, the system 100 may estimate a viewing direction and/or vergence of the user, which in turn may be used by the system 100 to infer a region of interest of the user. In particular embodiments, the region of interest may be determined based on an intersection of the user's view and objects in the scene, whether virtual or physical. For virtual objects, the system 100 knows their locations in 3D space and therefore could compute the location at which the user's view intersects a virtual object. For physical objects, the system 100 may build a 3D model representation of the user's real-world environment based on sensor data captured over time. The 3D model may be represented using a 3D mesh, RGBD keyframes, an implicit neural network model, or any other suitable 3D model representation. The system 100 may compute the location at which the user's view intersects a portion of the 3D model representation of the real-world. Based on the point of intersection between the user's view and an object (virtual or physical), the system 100 may compute a desired scene depth for the user, which may be used to instruct the HMD's 104 autofocus cameras, as will be described in more detail below.

In particular embodiments, determining the desired scene depth may also be based on contextual signals known to the artificial reality system 100. Contextual information may include any information that helps the system 100 infer an interest or intent of the user. For example, if the user is using an MR application, the application would know the current state of the application. For instance, if the user is playing a virtual game of chess where a virtual chessboard is anchored to a physical table, the application could assume that the user is mostly interested in the region where the chessboard and table are located. Thus, even if the user's gaze is only in the vicinity of but does not intersect the chessboard or the physical table directly, the system 100 may nevertheless determine that the user is likely interested in seeing the region where the chessboard and table are located. Based on this contextual information, the system 100 may compute a desired scene depth based on the location of the chessboard and/or table and instruct the autofocus cameras to adjust their focal distances accordingly so that passthrough images of the region would be in focus. In other embodiments, contextual information may also include temporal or historical information. For example, objects in the scene with which the user has been interacting for a period of time are more likely to be of interest to the user. As another example, a region in space on which the user has been fixated for a period of time is more likely to be of interest than other regions that the user merely glances at. In this case, the system 100 may, in particular embodiments, only instruct the autofocus cameras to adjust their focal distance when the user has been fixated on something for a threshold amount of time. When the user is not looking at or interacting with any object in particular, the system 100 may avoid instructing the cameras to re-focus.

In particular embodiments, the artificial reality system 100 may further have one or more controllers 106 that enable the user 102 to provide inputs, and inputs from the controllers may further provide context to help the system 100 determine regions in which the user might be interested in seeing. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera. The orientation of the controllers 106 and/or any explicit input provided through the controllers 106 may provide the system 100 additional contextual information about the user's interest. For example, a virtual laser pointer may extend from the controller and allow the user to aim at and/or interact with virtual or physical objects. When the user is also looking at the same objects, the system 100 could conclude with high confidence that the user is interested in seeing the region in which the objects are located and compute a corresponding desired scene depth for adjusting the autofocus cameras. While the present example involves a user using controllers 106 to interact in MR, the present disclosure contemplates any other suitable means for interacting in MR as well. For example, as previously mentioned, the system 100 may use its external-facing cameras to track the hands and/or body of the user. The tracked positions and/or motions of the user's hands and body could also be used to infer the user's interest and intent.

The artificial reality system 100 may further include a computer unit 108 configured to perform the operations described herein, including but not limited to tracking the user's eye gaze, determining the desired scene depth for the user, adjusting the focal distance of the cameras, generating passthrough images, etc. The computer unit may be a stand-alone unit that is physically separate from the HMD 104, or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone.

MR passthrough applications have several design goals. Firstly, a user needs to see the real-world environment in real-time, which means the latency for generating passthrough output images needs to be low. This is in contrast to conventional camera systems used for photography, where latency is generally not an issue. Secondly, as previously discussed, passthrough images would ideally adjust their DoF or focus to reflect the gaze or intent of the user. Thus, conventional autofocus algorithms, which use fixed metering regions, depth information, or scene content to drive autofocus, are inadequate because they do not take into account what the user is actually looking at in the scene.

Figure 2:
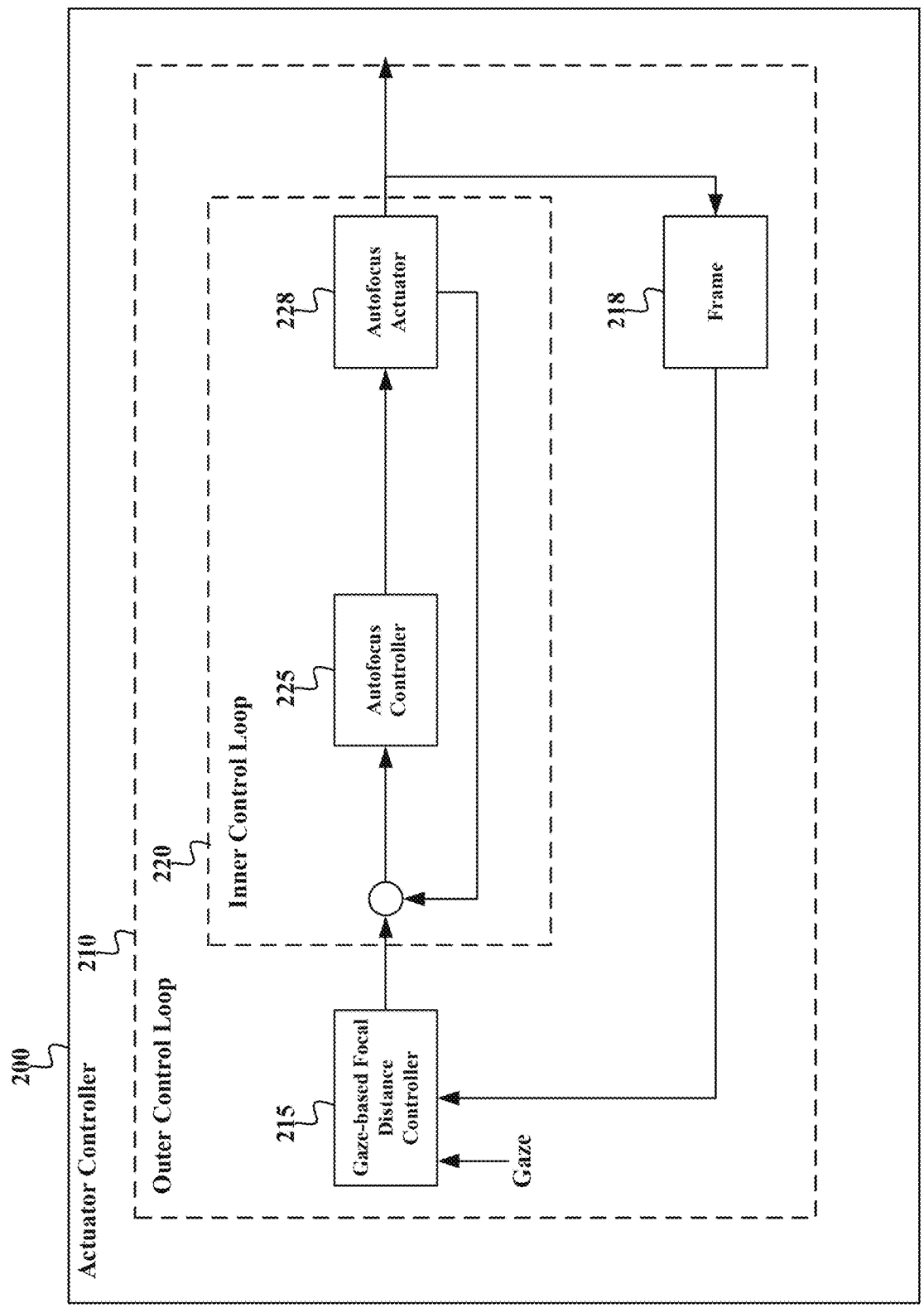
FIG. 2 illustrates an example block diagram for an actuator controller 200 for controlling the focal distance of the cameras 105A-B used for capturing images for passthrough generation.

FIG. 2 illustrates an example block diagram for an actuator controller 200 for adjusting the focal distance of the cameras 105A-B used for capturing images for passthrough generation. In particular embodiments, the actuator controller 200 may include an outer control loop 210 and an inner control loop 220. At a high level, the outer control loop 210 determines the desired scene depth and instructs the inner control loop 220 to adjust the lens from a starting position (or state) to a target position (or state) so that the camera's DoF covers the desired scene depth.

In particular embodiments, the outer loop 210 may have a gaze-based focal distance controller 215 that uses the gaze of the user to determine a desired scene depth (also referred to as z-depth). As previously discussed, the eye gaze of the user may be determined using an eye-tracking system. In particular embodiments, the actual measured gaze may be used to drive the subsequent autofocus process, which is described below. Using the actual measured gaze may be appropriate in situations where the latency for autofocusing and generating a passthrough image is very short. In other embodiments, a predicted gaze may be used instead to account for the latency of the passthrough-generation pipeline and/or the autofocus process. For example, instead of using the user's gaze measured at time t, the controller 215 may instead predict the user's gaze at time t+d. The time delay d may account for a known latency between the time at which gaze is estimated and when the passthrough image is displayed to the user. The time delay d may also account for an estimated latency needed for adjusting the camera's focal distance. Any suitable gaze prediction technique may be used. For example, based on the current eye gaze of the user at time t along with motion information (e.g., eye rotation velocity, head movement captured by an IMU on the HMD, etc.), the gaze-based focal distance controller 215 may extrapolate a predicted gaze direction of the user at time t+d.

Based on the user's gaze (predicted or actual, depending on the embodiment), the gaze-based focal distance controller 215 may determine a desired scene depth for the user and use it to adjust the cameras' 105A-B focal distance. As previously described, the desired scene depth may be computed in several ways. For example, the controller 215 may use the two gaze vectors of the user's eyes to compute a point in 3D space where the vectors converge. The location of that 3D point would allow the controller 215 to compute a focal distance for the cameras 105A-B. In another embodiment, the controller 215 may use the eye gaze of the user (predicted or actual) to determine what the user may be looking at. Conceptually, the controller 215 may cast rays corresponding to the user's gaze vectors and determine whether they intersect a virtual or physical object. The 3D locations of virtual objects, which are tracked by one or more software applications, would be known to the controller 215. Furthermore, as previously described, the passthrough pipeline may include generating a 3D model that represents the user's real-world surroundings. The controller 215 may estimate the user's desired scene depth by computing intersections between the user's gazes and virtual or physical objects in the scene.

In yet another embodiment for determining a desired scene depth, the controller 215 may use contextual information to infer the subject of the user's interest. As previously described, the controller 215 may have access to the state information of an MR application. Such state information could inform the controller 215 of the likely objects that the user may be viewing or interacting with. For example, when the user is playing chess using a virtual chessboard anchored to a physical table, the user would likely want the physical region corresponding to the physical table to be in focus in the passthrough image. In another embodiment, the controller 215 may use past information to predict the user's current interest. For example, if the user has been sequentially viewing or interacting with a series of virtual artifacts based on their relative distance to the user, the controller 215 may be able to predict, with higher confidence, where the user would likely look next. In some cases, the controller 215 may also anticipate that the user would likely pay attention to particular content designed to catch the user's attention. For example, if the controller 215 knows that a virtual alert has surfaced on the user's real-world refrigerator, the controller 215 would have more confidence that the user would likely look at the alert, especially if the user's gaze falls in the general direction of the refrigerator. As yet another example, the controller 215 may classify, based on eye-tracking data, whether the user is in a vergence movement or in fixation. If the user is fixated on an object (e.g. the user's fixation satisfies a predetermined timing threshold), the controller 215 may choose to perform autofocusing so that the user could clearly see the objects of interest. If the user is currently in vergence movement, however, the controller 215 may choose to suspend autofocusing until the user starts fixating on a physical or virtual object. In particular embodiments, the controller 215 may also have a default or fallback focus state. For example, when the user is in vergence movement or when eye-tracking data is missing or has a low confidence score, controller 215 may fall back to using a default scene depth. In particular embodiments, the default scene depth may also be determined based on the size of the user's environment (e.g., a larger default depth is used when the user is in a larger room, and a smaller default depth is used when the user is in a smaller room). One of ordinary skill in the art would recognize that these examples are not exhaustive, and that the controller's 215 logic may take into consideration any other suitable types of contextual information to help improve the controller's 215 determination of the user's desired scene depth.

In particular embodiments, the autofocus system may be configured to select between one or more predetermined discrete focal distances rather than adjusting along a continuous spectrum of focal distances. Doing so avoids having to continuously run autofocus, thereby saving power and eliminating many anticipated error cases. For example, the autofocus system may have a predetermined near-range focal distance (e.g., 25 centimeters), a predetermined mid-range focal distance (e.g., 50 centimeters), a predetermined far-range focal distance (e.g., 1 meter), and a predetermined infinite-range focal distance (e.g., 2 meters). While the foregoing example has four predetermined focal distances, this disclosure contemplates any number of predetermined focal distances, such as one, two, three, five, six, etc. Each predetermined focal distance may also have one or more predetermined focus points or areas (e.g., center area, upper area, upper-left area, lower-right area, etc.). The autofocus system may select one of the default focal distances closest to the region of interest of the user, which may be predicted based on a combination of available signals (e.g., eye tracking data, vergence information, object detection, scene depth, phase detection autofocus, machine-learning based predictions, etc.). The autofocus system may adjust the cameras' focal distances by switching only between predetermined focal distances. For example, once controller 215 selects one of the default focal distances, it may maintain that focal distance until another predetermined focal distance becomes a better candidate for the user's new region of interest, according to one or more criteria. For instance, controller 215 may cause the cameras to switch to a new predetermined focal distance when the user's region of interest becomes closer to that predetermined focal distance for at least a threshold period of time.

After the outer control loop 210 determines the desired scene depth for the user, it may send that information to the inner control loop 220. The inner control loop 220 may have an autofocus controller 225 that would iteratively adjust the lenses of the cameras 105A-B to achieve a focal distance that coincides with the desired scene depth. The autofocus controller 225 may use any suitable technique to achieve this goal. For example, the autofocus controller 225 may use the target desired scene depth provided by the gaze-based focal distance controller 215, along with the current focal distance of the current lens configuration, to generate an instruction for an autofocus actuator 228. For example, the autofocus controller 225 may determine the magnitude of the desired lens displacement based on a difference between the target focal distance and the current focal distance. The instruction may cause the autofocus actuator 228 to adjust the lenses accordingly. The resulting estimated focal distance of the adjusted lenses may then be provided back to the autofocus controller 225. The autofocus controller 225 may repeat the process of generating an instruction for the autofocus actuator 228 based on the desired scene depth and the current focal distance of the lenses. The autofocus controller 225 may use any suitable technique to optimize the autofocusing process. For example, the autofocus controller 225 may have a predetermined number of discrete zones to which the camera lenses may move. As another example, the autofocus controller 225 may employ phase detection autofocus techniques to verify whether the focus depth plane of the user has a physical object. Once the autofocus process is complete (e.g., when the actual focal distance of the camera is within a threshold of the desired scene depth), the shutters of cameras 105A-B may be actuated to capture images of the scene. The captured images may then be used to generate passthrough images for the user.

In particular embodiments, exposure and white balance of the cameras 105A-B may also be adjusted based on the regions or objects of interest of the user. For example, an exposure and/or white-balance controller may use the region or object of interest, as determined using the techniques described above, to compute the proper exposure and/or white balance for the autofocus cameras 105A-B. By knowing where the user is looking, the exposure/white-balance algorithms may prioritize those areas or give them more weight when computing the optimal exposure/white-balance settings. Using gaze or intent-based autofocus, exposure, and white-balance control, the resulting passthrough images would have the appropriate focal cues and would appear sharper and clearer.

Figure 3:
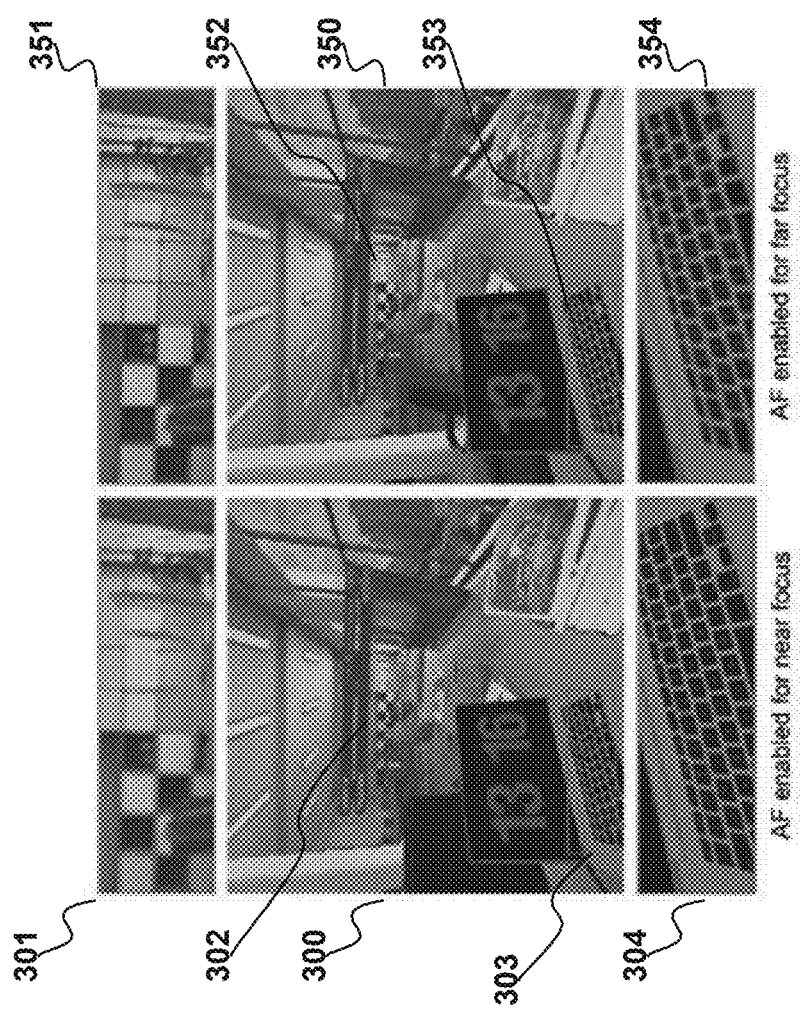
FIG. 3 illustrates an example of passthrough images rendered using embodiments described herein.

FIG. 3 illustrates an example of passthrough images rendered using embodiments described herein. The column of images 300, 301, 304 shown on the left were generated when the user was focusing on a nearby object. Based on the user's gaze, the actuator controller 200 instructed the autofocus actuator to adjust the focal distance of cameras 105A-B to be optimized for the near field. The image captured by the cameras 105A-B was used to generate passthrough image 300. Since the user was focusing on the near field, the keyboard region 303 was in focus, as more clearly shown in the zoomed-in view 304 of the keyboard region 303. In contrast, the back of the room 302 was not in focus, as more clearly shown in its zoomed-in view 301.

The column of images 350, 351, 354 shown on the right were generated when the user was focusing on the far field. Based on the user's gaze, the actuator controller 200 instructed the autofocus actuator to adjust the focal distance of cameras 105A-B to be optimized for the far field. The image captured by the cameras 105A-B was used to generate passthrough image 350. Since the user was focusing on the far field, the keyboard region 353 was not in focus, as more clearly shown in the zoomed-in view 354 of the keyboard region 353. In contrast, the back of the room 352 was in focus, as more clearly shown in its zoomed-in view 351.

Figure 4:
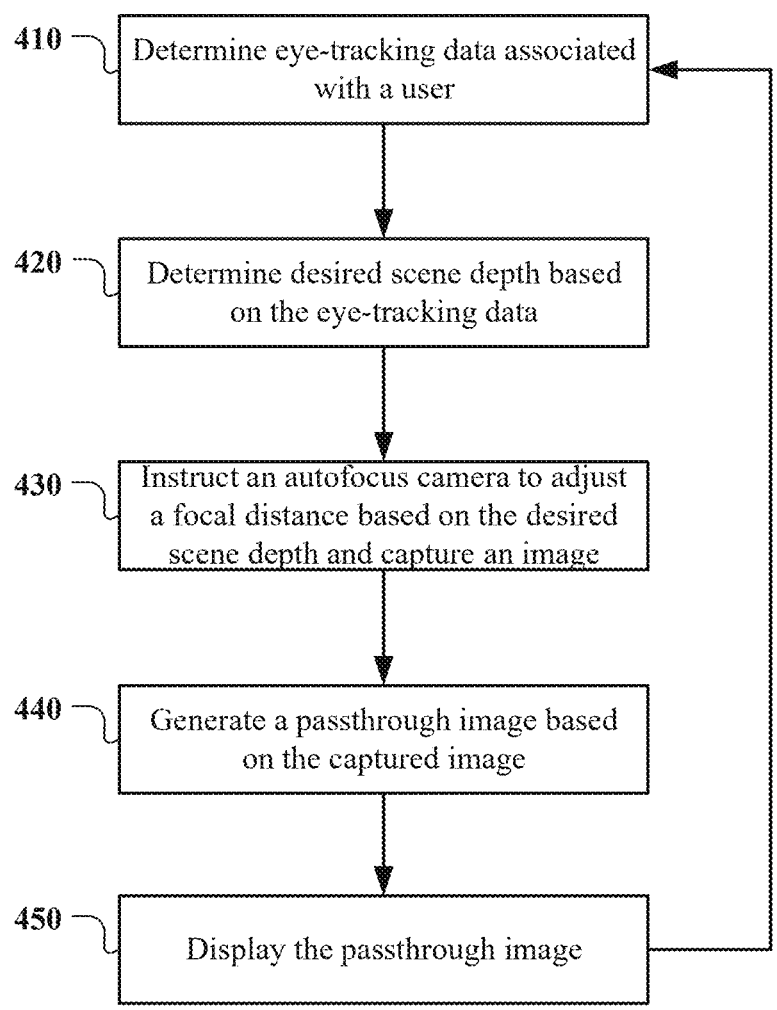
FIG. 4 illustrates an example of a method for controlling the autofocus of cameras based on the user's gaze and generating passthrough images based on captured images.

FIG. 4 illustrates an example of a method for controlling the autofocus of cameras based on the user's gaze and generating passthrough images based on captured images. At step 410, a computing system (e.g., an integrated system within an HMD, a separate mobile computing unit communicatively coupled to the HMD via wired or wireless connections, a server communicatively coupled to the HMD, or any other suitable computing architecture for an HMD) may use an eye-tracking system of an HMD to determine eye-tracking data associated with a user of the HMD. At step 420, the system may determine, based on the eye-tracking data, a desired scene depth for the user. In particular embodiments, the eye-tracking data may be used to determine the current or predicted eye gazes of the user. The predicted gazes may be associated with a future time determined based on a predetermined duration corresponding to a latency associated with a pipeline for rendering passthrough images. The system may then use the eye gazes (predicted or current) of the user to determine the desired scene depth for the user based on, e.g., vergence of the user's eye gazes, a point of intersection between the user's gazes or view direction and one or more physical objects in the scene (e.g., by computing an intersection between the user's gazes or view direction and a three-dimensional model representation of the real-world environment), a point of intersection between the user's gazes or view direction and one or more virtual objects positioned relative to the real-world environment, and/or additional contextual information related to the current state of the user or an application being used by the user. At step 430, the system may instruct a first autofocus camera of the head-mounted device to adjust a first focus distance based on the desired scene depth and capture a first image of a real-world environment of the user. Similarly, the system may instruct a second autofocus camera of the head-mounted device to adjust a second focus distance based on the desired scene depth and capture a second image of the real-world environment of the use. At step 440, the system may generate a first passthrough image based on the first image. The system may also generate a second passthrough image based on the second image. At step 450, the system may display the first passthrough image to a first eye of the user (e.g., left eye) via a first display of the head-mounted device. The system may simultaneously display the second passthrough image to a second eye of the user (e.g., right eye) via a second display of the head-mounted device.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for generating passthrough images including the particular steps of the method of FIG. 4, this disclosure contemplates using any, all, or some of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
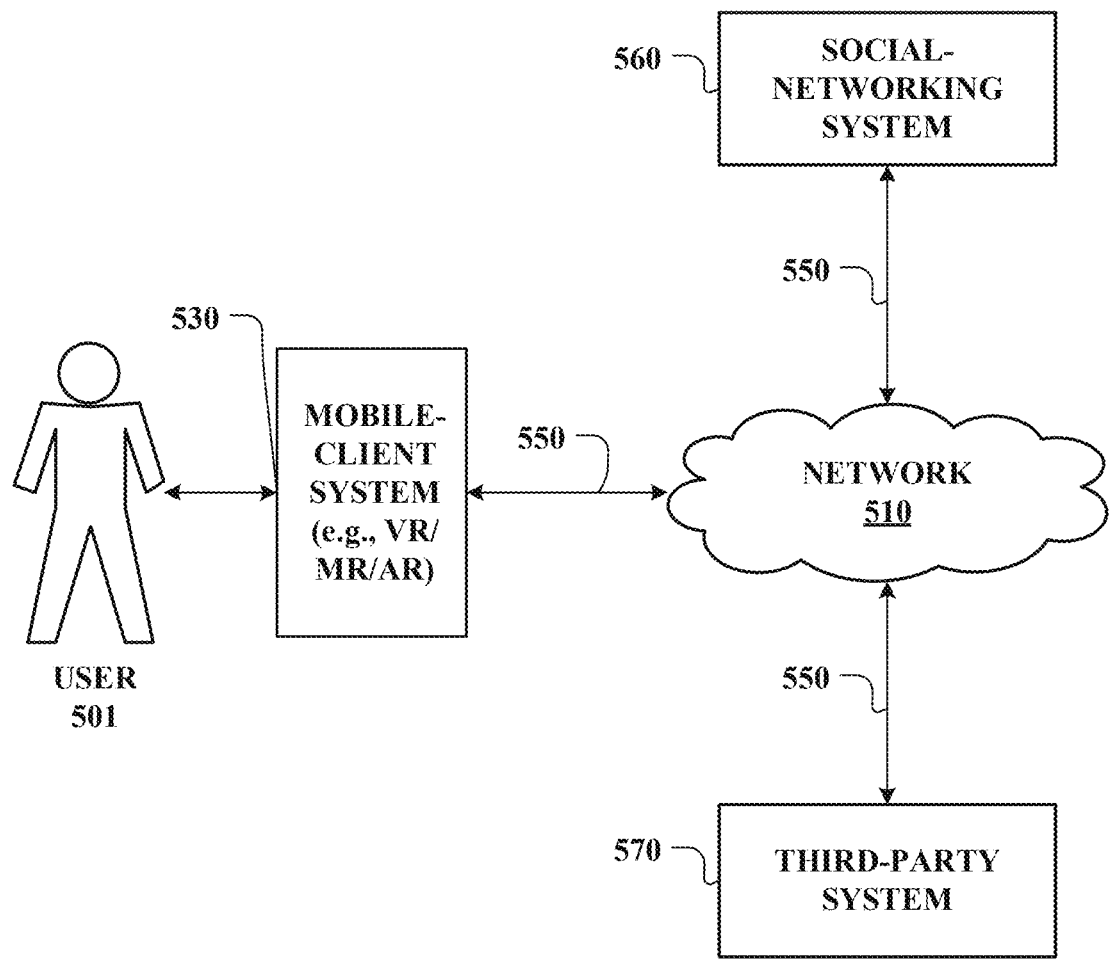
FIG. 5 illustrates an example network environment associated with a social-networking system.

FIG. 5 illustrates an example network environment 500 to which a client system 530 (e.g., a virtual-reality, mixed-reality, or artificial-reality device embodying the techniques described herein) may be connected. Network environment 500 includes a user 501, a client system 530, a social networking system 560, and a third-party system 570 connected to each other by a network 510. Although FIG. 5 illustrates a particular arrangement of user 501, client system 530, social-networking system 560, third-party system 570, and network 510, this disclosure contemplates any suitable arrangement of user 501, client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of users 501, client systems 530, social-networking systems 560, third-party systems 570, and networks 510. As an example and not by way of limitation, network environment 500 may include multiple users 501, client system 530, social-networking systems 560, third-party systems 570, and networks 510.

In particular embodiments, user 501 may be an individual (human user), an entity (e.g., an enterprise, business, or third-party application), or a group (e.g., of individuals or entities) that interacts or communicates with or over social-networking system 560. In particular embodiments, social-networking system 560 may be a network-addressable computing system hosting an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. In particular embodiments, social-networking system 560 may include an authorization server (or other suitable component(s)) that allows users 501 to opt in to or opt out of having their actions logged by social-networking system 560 or shared with other systems (e.g., third-party systems 570), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 570 may be accessed by the other components of network environment 500 either directly or via network 510. In particular embodiments, one or more users 501 may use one or more client systems 530 to access, send data to, and receive data from social-networking system 560 or third-party system 570. Client system 530 may access social-networking system 560 or third-party system 570 directly, via network 510, or via a third-party system. As an example and not by way of limitation, client system 530 may access third-party system 570 via social-networking system 560. Client system 530 may be any suitable computing device, such as, for example, a personal computer, a laptop computer, a cellular telephone, a smartphone, a tablet computer, or an augmented/virtual reality device.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

Figure 6:
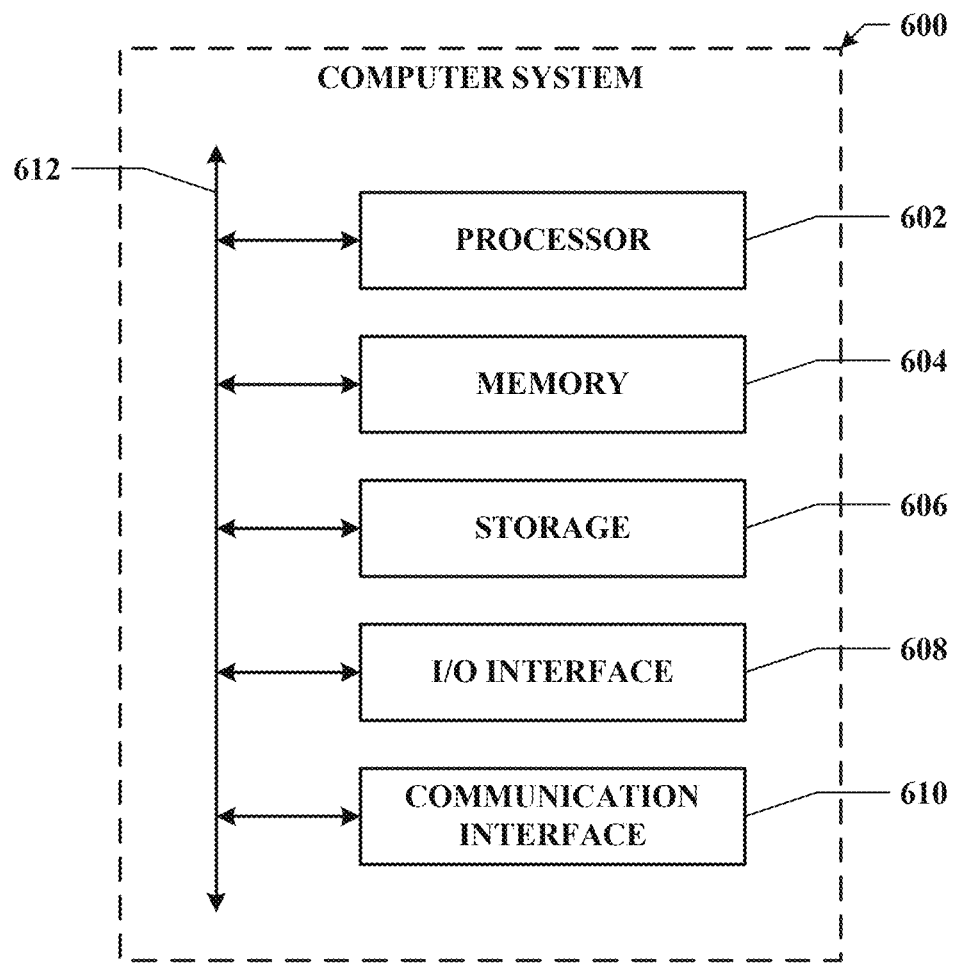
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by computing system:
    determining at a first time, based on eye-tracking data, whether a user is in a vergence movement or a fixating on an object;
    instructing, responsive to the determining that the user is fixating on the object, a first autofocus camera of a head-mounted device to implement an autofocusing operation, the autofocusing operation including:
        adjusting a first focus distance based on a desired scene depth, and
        capturing a first image of a real-world environment of the user that includes the object;
    determining at a second time, based on additional eye-tracking data, whether the user is in the vergence movement or fixating on the object; and
    instructing, responsive to the determining that the user is in the vergence movement, the first autofocus camera to suspend the autofocusing operation.

2. The method of claim 1, further comprising:
    instructing a second autofocus camera of the head-mounted device to adjust a second focus distance based on the desired scene depth and capture a second image of the real-world environment of the user;
    generating a second passthrough image based on the second image; and
    displaying the second passthrough image to a second eye of the user via a second display of the head-mounted device.

3. The method of claim 1, further comprising:
    generating predicted gazes of the user based on the eye-tracking data;
    wherein the desired scene depth is determined based on the predicted gazes.

4. The method of claim 3, wherein the predicted gazes are associated with a future time determined based on a predetermined duration corresponding to a latency associated with a pipeline for rendering passthrough images.

5. The method of claim 3, wherein the desired scene depth is determined based on a vergence of the predicted gazes of the user.

6. The method of claim 3, wherein the desired scene depth is determined based on an intersection between the predicted gazes of the user and a three-dimensional model representation of the real-world environment.

7. The method of claim 3, wherein the desired scene depth is determined based on an intersection between the predicted gazes of the user and one or more virtual objects positioned relative to the real-world environment.

8. The method of claim 1, wherein the desired scene depth is further determined based on contextual information or an interaction between the user and one or more virtual objects or physical objects.

9. One or more computer-readable non-transitory storage media embodying software that is operable when executed to:
    determine at a first time, based on eye-tracking data, whether a user is in a vergence movement or fixating on an object;
    instruct, responsive to the determination that the user is fixating on the object, a first autofocus camera of a head-mounted device to implement an autofocusing operation, the autofocusing operation including:
        adjusting a first focus distance based on a desired scene depth, and
        capturing a first image of a real-world environment of the user that including the object;
    determine at a second time, based on additional eye-tracking data, whether the user is in the vergence movement or fixating on the object; and
    instruct, responsive to the determining that the user is in the vergence movement, the first autofocus camera to suspend the autofocusing operation.

10. The one or more computer-readable non-transitory storage media of claim 9, wherein the software further operable when executed to:
    instruct a second autofocus camera of the head-mounted device to adjust a second focus distance based on the desired scene depth and capture a second image of the real-world environment of the user;
    generate a second passthrough image based on the second image; and
    display the second passthrough image to a second eye of the user via a second display of the head-mounted device.

11. The one or more computer-readable non-transitory storage media of claim 9, wherein the software further operable when executed to:
    generate predicted gazes of the user based on the eye-tracking data;
    wherein the desired scene depth is determined based on the predicted gazes.

12. The one or more computer-readable non-transitory storage media of claim 11, wherein the predicted gazes are associated with a future time determined based on a predetermined duration corresponding to a latency associated with a pipeline for rendering passthrough images.

13. The one or more computer-readable non-transitory storage media of claim 11, wherein the desired scene depth is determined based on a vergence of the predicted gazes of the user.

14. The one or more computer-readable non-transitory storage media of claim 11, wherein the desired scene depth is determined based on an intersection between the predicted gazes of the user and a three-dimensional model representation of the real-world environment.

15. A system comprising:
    one or more processors; and
    one or more computer-readable non-transitory storage media coupled to the one or more processors and comprising instructions operable when executed by the one or more processors to cause the system to:
    determine at a first time, based on eye-tracking data, whether a user is in a vergence movement or fixating on an object;
    instruct, responsive to the determining that the user is fixating on the object, a first autofocus camera of a head-mounted device to implement an autofocusing operation, the autofocusing operation including:
        adjusting a first focus distance based on a desired scene depth, and
        capturing a first image of a real-world environment of the user;

determine at a second time, based on additional eye-tracking data, whether the user is in the vergence movement or fixating on the object; and instruct, responsive to the determining that the user is in the vergence movement, the first autofocus camera to suspend the autofocusing operation.

16. The system of claim 15, wherein the instructions are further operable when executed by the one or more processors to:

instruct a second autofocus camera of the head-mounted device to adjust a second focus distance based on the desired scene depth and capture a second image of the real-world environment of the user;

generate a second passthrough image based on the second image; and display the second passthrough image to a second eye of the user via a second display of the head-mounted device.

17. The system of claim 15, wherein the instructions are further operable when executed by the one or more processors to:

generate predicted gazes of the user based on the eye-tracking data;

wherein the desired scene depth is determined based on the predicted gazes.

18. The system of claim 17, wherein the predicted gazes are associated with a future time determined based on a predetermined duration corresponding to a latency associated with a pipeline for rendering passthrough images.

19. The system of claim 17, wherein the desired scene depth is determined based on a vergence of the predicted gazes of the user.

20. The system of claim 17, wherein the desired scene depth is determined based on an intersection between the predicted gazes of the user and a three-dimensional model representation of the real-world environment.

* * * * *